United States Patent
Mazurkiewicz et al.

(10) Patent No.: US 6,651,339 B2
(45) Date of Patent: Nov. 25, 2003

(54) METHOD FOR PRODUCING A WIPER-STRIP SUPPORT ELEMENT FOR MOTOR VEHICLE WINDSHIELD WIPERS

(75) Inventors: Julius Mazurkiewicz, Diest (BE); Paul Criel, Truiden (BE); Peter De Block, Halen (BE); Peter Wijnants, Wezemaal (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,478

(22) PCT Filed: May 11, 2001

(86) PCT No.: PCT/DE01/01802

§ 371 (c)(1),
(2), (4) Date: Feb. 19, 2002

(87) PCT Pub. No.: WO02/06099

PCT Pub. Date: Jan. 24, 2002

(65) Prior Publication Data

US 2002/0144389 A1 Oct. 10, 2002

(30) Foreign Application Priority Data

Jul. 13, 2000  (DE) .......................................... 100 34 091

(51) Int. Cl.⁷ ................................................ B21F 35/00
(52) U.S. Cl. ..................... 29/896.91; 29/896.9; 29/412; 29/417; 29/418
(58) Field of Search ................................ 29/896.9, 412, 29/417, 418, 896.91

(56) References Cited

U.S. PATENT DOCUMENTS 2,182,968 A * 12/1939 Lunsford 6,308,373 B1 * 10/2001 Merkel et al.
6,397,428 B2 * 6/2002 Kotlarski

FOREIGN PATENT DOCUMENTS

DE  198 02 451 A   7/1999
DE  100 25 708 A1  11/2001

OTHER PUBLICATIONS

Patent Abstracts of Japan vol. 1998, No. 03, Feb. 27, 1998 & JP 09 285834 A, Nov. 4, 1997.

* cited by examiner

Primary Examiner—P. W. Echols
(74) Attorney, Agent, or Firm—Michael J. Striker

(57) ABSTRACT

The invention relates to a method for producing a bandlike-elongated, spring-elastic element (12) for supporting a rubber-elastic wiper strip (22) of a windshield wiper for vehicles, which element has two spring rails (26, 28), located with a spacing (24) from one another and essentially parallel to one another, which at least on both of their end portions are solidly joined together by transverse ribs (30) that are disposed on the one band face (14) of the spring rails and that span the spacing (24). An especially advantageous production method for such a support element is obtained in that the prefabricated spring rails (26, 28) are solidly joined together in pairs and oriented essentially parallel to one another by means of at least one bandlike retaining element (44) oriented transversely to the spring rails; that the gridlike combination (54) thus obtained is subjected to at least one further method step, by which, by cutting the retaining element (44) between the applicable pairs of spring rails (26, 28), the support elements (12) are released from the combination (54).

9 Claims, 5 Drawing Sheets

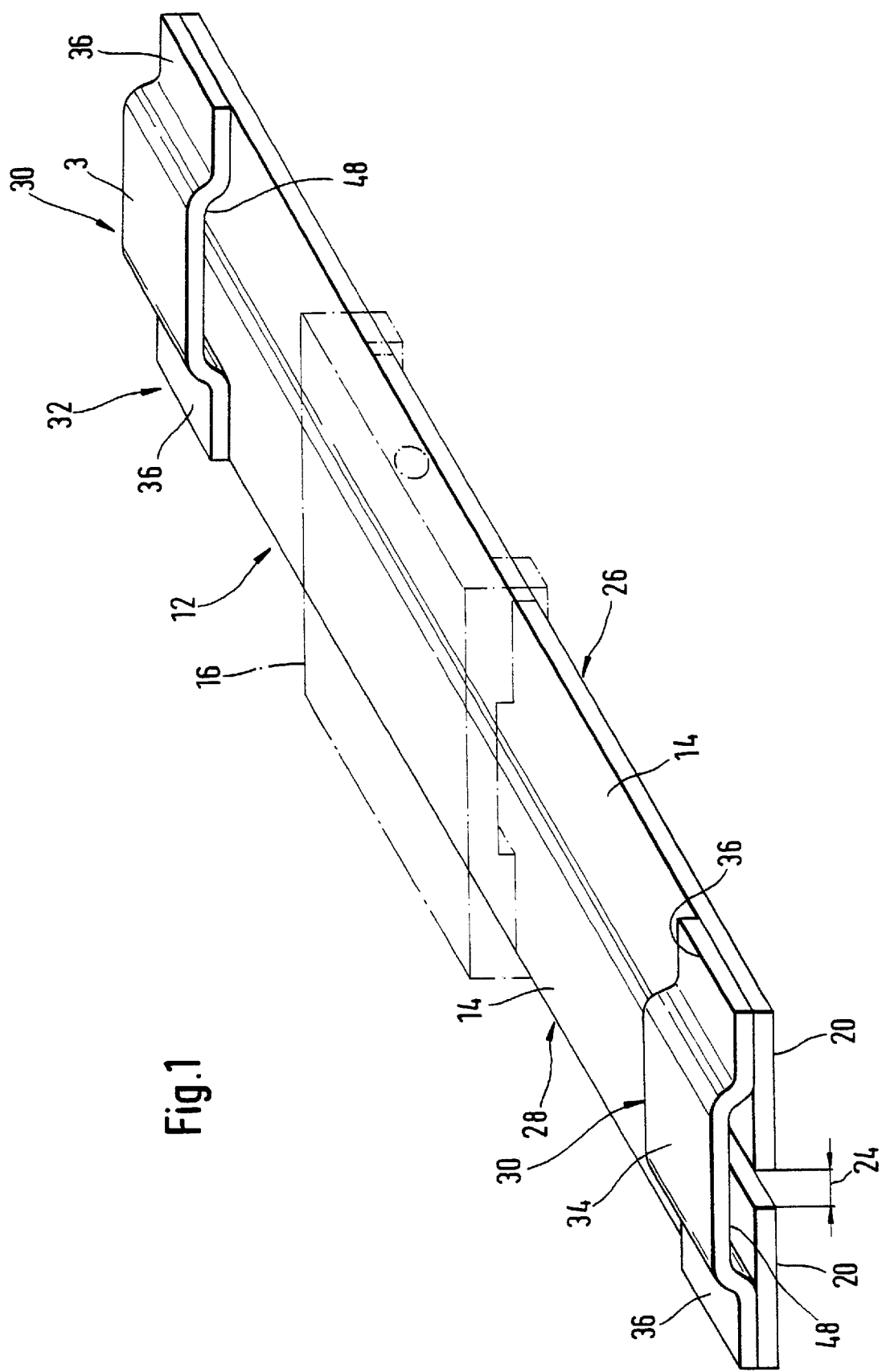

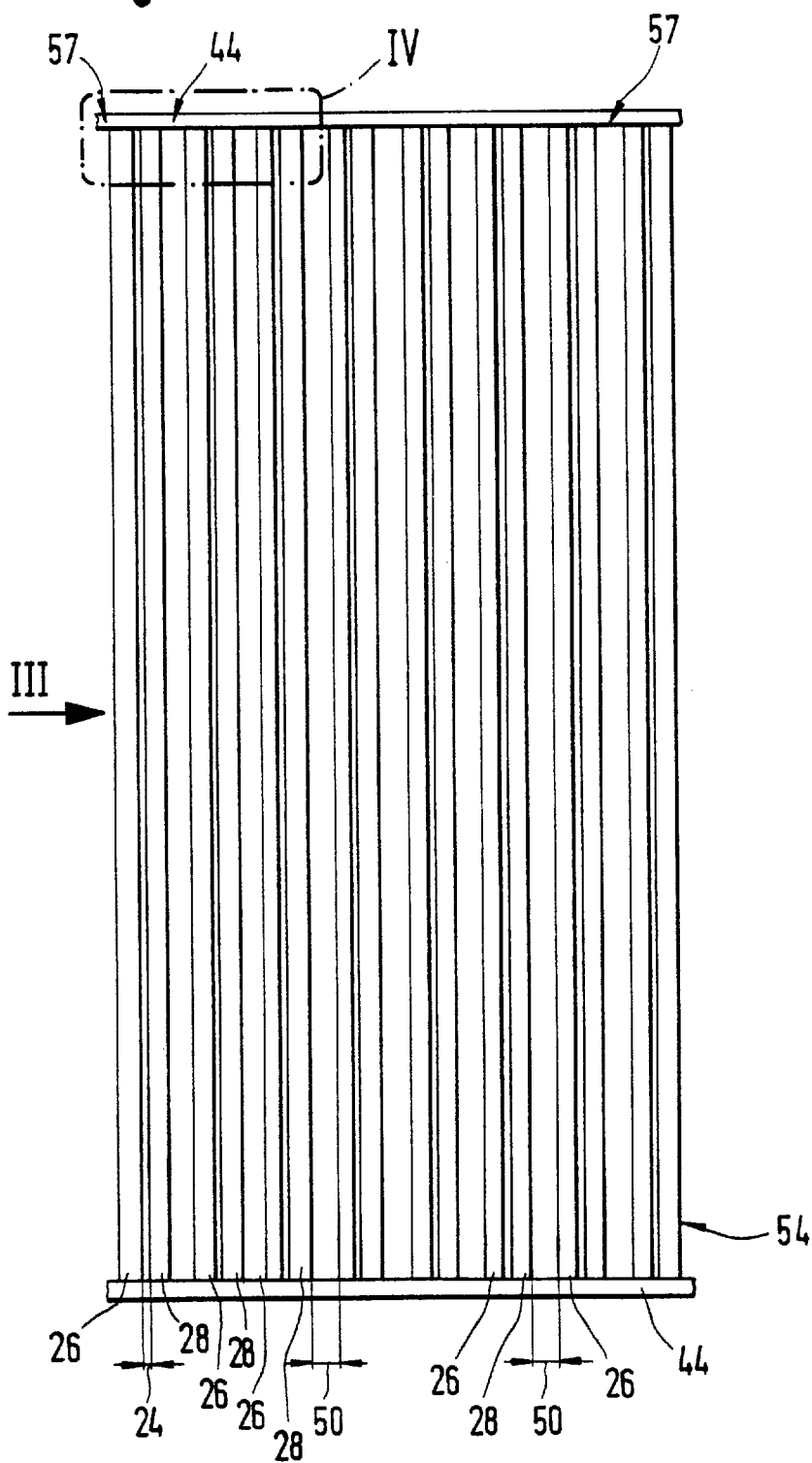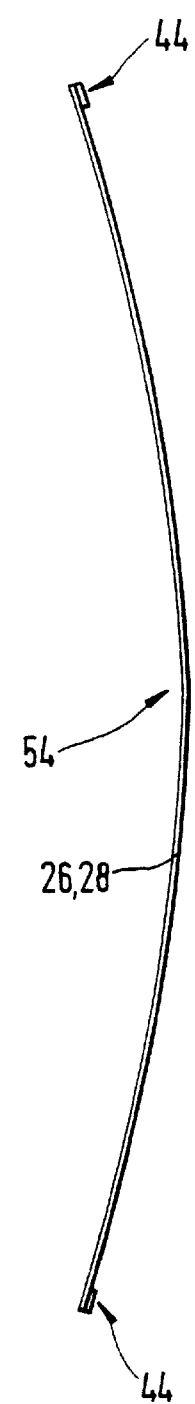

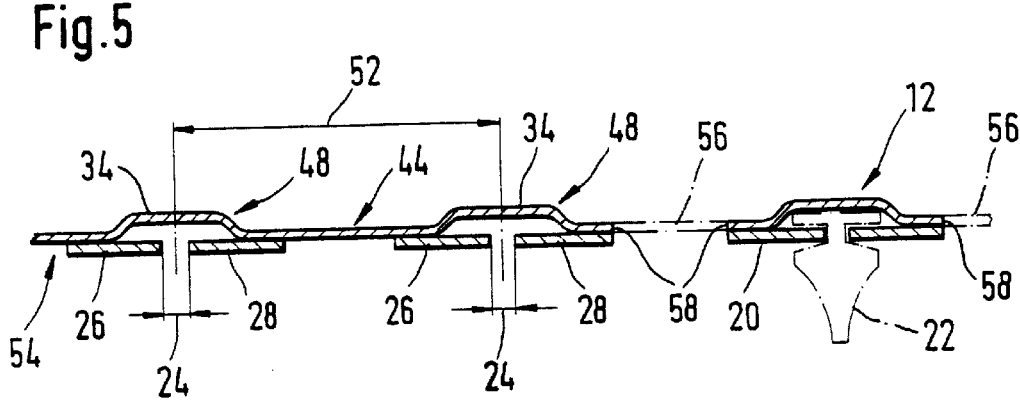
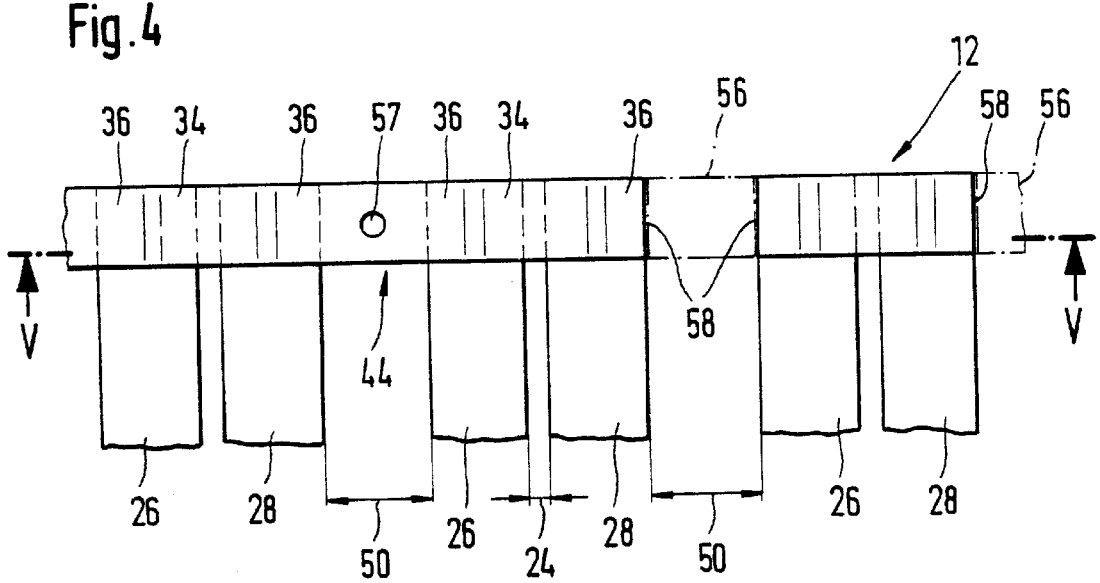

METHOD FOR PRODUCING A WIPER-STRIP SUPPORT ELEMENT FOR MOTOR VEHICLE WINDSHIELD WIPERS

BACKGROUND OF THE INVENTION

A support element similar to the support element in question at present includes longitudinal rails, which are joined via bridge ribs, and is known for instance from German Published, Non-Examined Patent Application DE-OS 100 25 708. The production of such a support element is conventionally done such that after the spring rails and the bridge ribs have been straightened, these bridge ribs are welded to the spring rails. After that, the crude individual support elements thus formed are subjected to further method steps. These further method steps can be the elimination by means of a heat treatment of the strains that might be present in the crude support elements, and after that subjecting the crude support elements to a prescribed surface treatment, which can for instance comprise rust removal, zinc plating, painting, and so forth of the blanks. To that end, the support elements resting in shipping containers have to be taken out of the containers and each put in a predetermined treatment position and after that delivered to the appropriate equipment that performs the desired treatment. Such a method for producing support elements always requires intermediate steps that can be performed only by hand and are thus expensive.

SUMMARY OF THE INVENTION

In the production method according to the invention, the support elements are securely held by the retaining element in a matlike or gridlike combination, making for especially simple further treatment of the support elements in which no manual steps, such as disconnecting the support elements that are hooked together in the shipping containers and straightening them again before each further method step, are necessary any longer.

It is especially advantageous if, for stabilizing the combination, one construction-like retaining element is secured to each of the two spring rail portions of the pairs of spring rails.

A further simplification of the production method according to the invention for a support element, in which the transverse ribs span the spacing between spring rails that belong together in the manner of an arch or bridge, is obtained if the two bandlike retaining elements are provided with recesses, adapted to the spacings between the spring rail pairs that belong together, which extend in bridgelike fashion from one spring rail to the other in a pair.

In the combination, many support elements can be subjected to a heat treatment, for instance, in a simple way to eliminate stresses existing in the support elements. In the gridlike combination, rust removal of the combination, antirust treatment such as zinc plating, including coatings such as ZnAl, ZnNi, ZnFe, and/or painting of the support elements, is possible. Securing the half toward the wiper blade of a device for connecting the wiper blade to a wiper arm in the combination is also an attractive option, because without further effort all the support elements can be delivered in a clearly defined position to an assembly station responsible for that purpose.

Cutting the individual support elements from the combination is advantageously done along the outer longitudinal edges of its two spring rails. This reduces the trimming waste to a minimum. In the zinc-plated support element, the resultant small raw cut edges are likewise protected against corrosion by remote action.

To assure a prescribed distribution of the wiper strip contact pressure against the window to be wiped, the spring rails are provided in their longitudinal direction with a curvature, to whose outer side, facing away from the window, the bellylike retaining element is secured.

Further advantageous refinements and features of the invention are disclosed in the ensuing description of an exemplary embodiment shown in the associated drawing.

BRIEF DESCRIPTION OF THE DRAWING

Shown in the drawing are:

FIG. 1, a support element produced by the method of the invention, in a perspective view that is not to scale;

FIG. 2, a plan view of reduced size on a plurality of support elements of FIG. 1, which according to the invention are solidly joined together by retaining elements;

FIG. 3, the disposition of FIG. 2 seen in the direction of the arrow III in FIG. 2;

FIG. 4, a detail in an enlarged view, marked IV in FIG. 2;

FIG. 5, a section through the disposition of FIG. 4 taken along the line IV—IV;

DESCRIPTION OF THE PREFERRED EMBODIMENT

Figure 7:
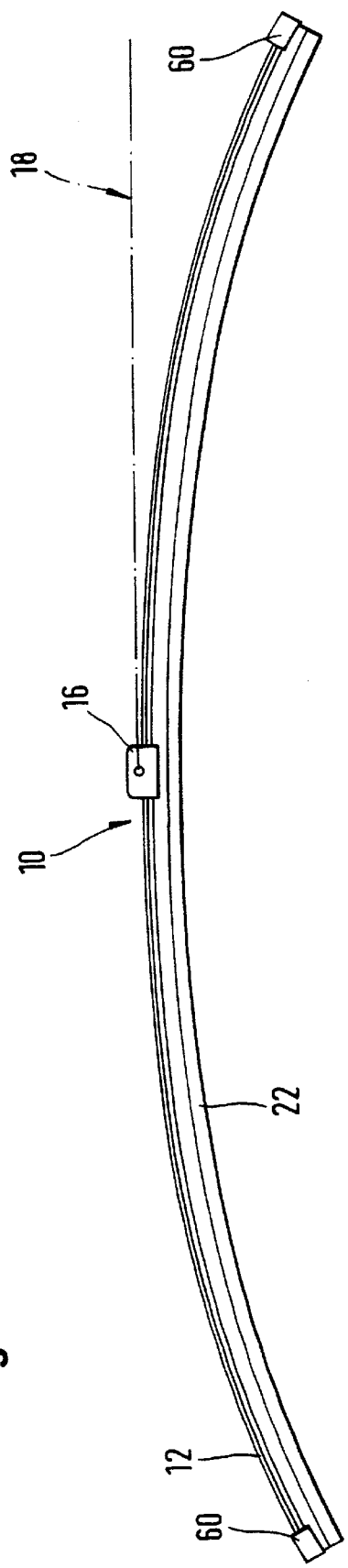
FIG. 7, a side view, not to scale, of a wiper blade, provided with the support element of FIG. 1, for motor vehicle windows.

A wiper blade 10 shown in FIG. 7 has an elongated, spring-elastic support element 12 (FIGS. 3 and 7) that is curved in the longitudinal direction and is shown separately, not to scale and stretched out, in FIG. 1. The principle of the half 16 toward the wiper blade of a connection device, with the aid of which the wiper blade 10 can be detachably joined to a driven wiper arm 18 guided along the body of a motor vehicle, is shown in dot-dashed lines on the top 14 of the support element 12—the top being the outer width of the support element curvature and facing away from the window to be wiped. An elongated, rubber-elastic wiper strip 22 is disposed parallel to the longitudinal axis (FIGS. 1 and 5) on the underside 20, facing toward the window—that is, the inside of the support element curvature. As seen particularly from FIG. 1, the support element 12 has two spring rails 26 and 28, oriented parallel to one another and with a spacing 24 from one another. On their two end portions, the two spring rails 26 and 28 are joined together by transverse ribs 30 and 32 on their top side 14. The transverse ribs 30 and 32 have a bridgelike shape, so that with their middle portion 34 they cross over and above the spacing 24 between the two spring rails 26 and 28. The transverse ribs 30 and 32 rest with their end portions 36 on the top sides 14 of the spring rails 26, 28, that is, on the top side of the support element 12, and are solidly joined to the spring rails in that position. This can be done for instance by means of a welding method, known per se.

Figure 6:
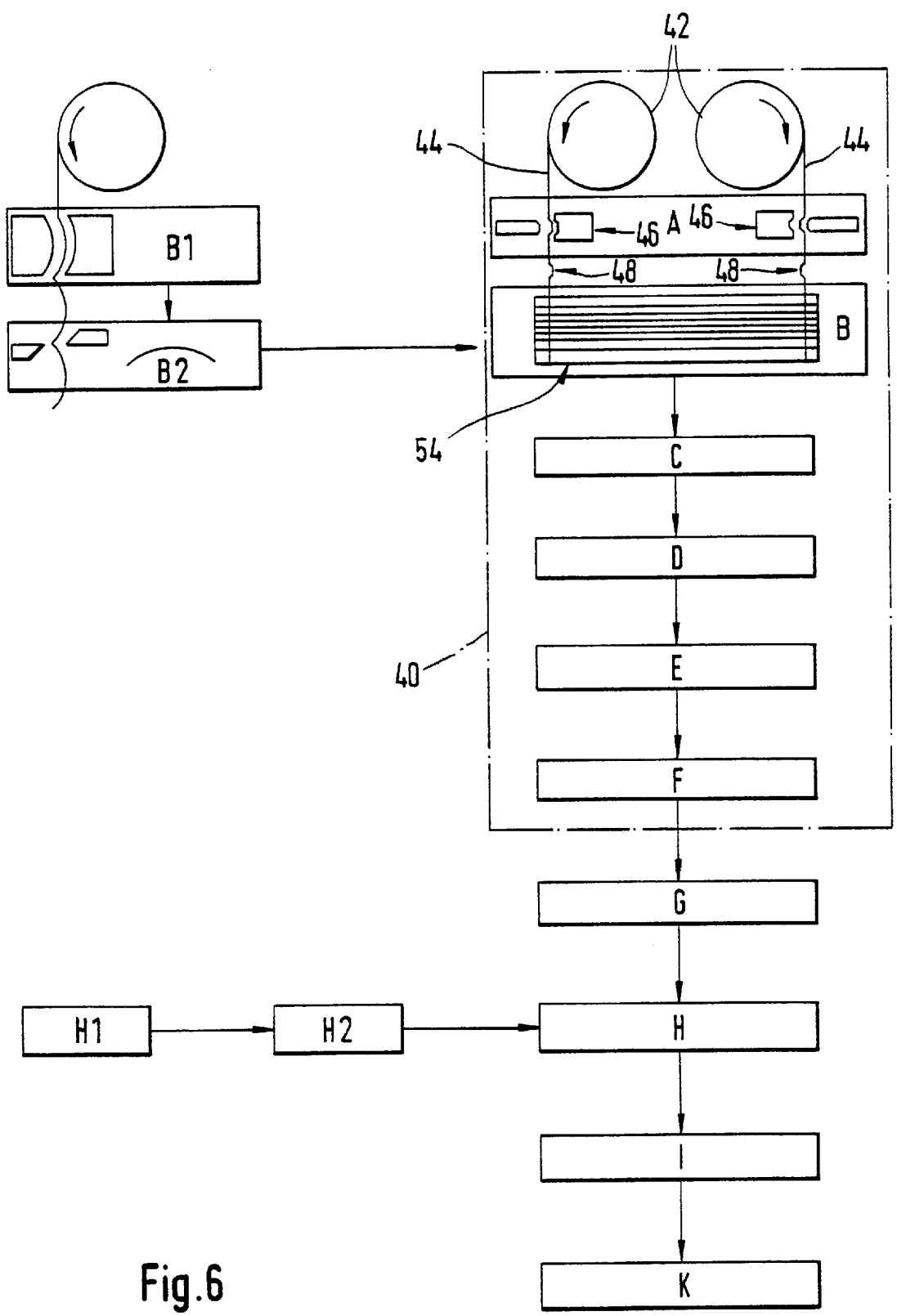
FIG. 6, a schematic breakdown of the individual method steps belonging to the method of the invention.

An especially advantageous method for producing such a support element 12 will now be described in further detail in conjunction with FIGS. 2, 4, 5 and 6. In FIG. 6, one example of such a method according to the invention for producing the support element is outlined by a dot-dashed line 40 within a diagram for production steps for producing the wiper blade 10 of FIG. 7. The method steps for producing the support element 12 are marked there by the letters A, B, C, D, E and F. In a preliminary step before the method of the invention, the spring rails are first bent in a preliminary method step B1 and then cut to the requisite length in a next method step B2, resulting in individual spring rails 26, 28.

By the method of the invention, band strips 44 are unwound from two rolls 42 of band material and delivered to embossing stations 46. There, successively at predetermined intervals, recesses 48 band strips 44 are made (method step A), after which the thus-recessed band strips 44 are delivered to a welding station There, many spring rails 26, 28 are lined up as prescribed. They are oriented parallel to one another there and are at certain spacings from one another (FIG. 4). The spring rails 26 and 28 of the same pair have the spacing 24 from one another. The spacing 50 between individual pairs of spring rails (FIG. 4) is limited to a minimum, which is arrived at in accordance with the requirements of the later method steps. The resultant pitch 52 (FIG. 5) from one pair of spring rails to the next pair of spring rails occurs again In the pitch of the recesses 48 in the band strips 44. It is also important that the recesses 48 in both sand strips 44 are aligned with one another viewed transversely to the longitudinal extent of the band strips. If while the band strips 44 are being unrolled from their rolls 42 of band material, in Their recesses 48 reach the position shown in FIG. 5 relative to the spring rail pairs 26,28, the spring rails 26,28 are solidly joined on both end portions to the band strips 44. This method step can be attained for instance by a welding method known per se (method step B). In method step B, the prefabricated spring rails 26, 28 of a plurality of support elements 12 are thus solidly joined, being in pairs and oriented parallel to one another, to the two band strips 44, which are oriented transversely to the spring rails and are [embodied in] bandlike [fashion]. By means of the construction strips 44 acting as retaining elements, a matlike or gridlike combination 54 is thus obtained, which because of the curved spring rails 26, 28 is channel-like in shape and can easily be delivered to later method steps. Because of the previous method steps, it is possible that there may be stresses in the spring rails 26 and 28 that impair the quality of the wiping work done by a windshield wiper. It can accordingly be expedient if the gridlike combination 54 (FIGS. 2 and 6) is subjected to a heat treatment (method step C) to eliminate these stresses. To protect the support element 12 against aggressive environmental factors, It is expedient if the gridlike combination is zinc-plated, in a further method step (D).

If previously zinc-plated band is used for the retaining elements 44, then in an intermediate step—before method step B—the zinc coating can be partially removed in a suitable way. After that, in the exemplary embodiment, the combination 54 is painted in a further method step E.

Finally, the combination reaches a cutting station where the support elements 12 located in the combination 54 are cut apart. Here the two band strips 44 acting as a retaining element are cut out of the combination along the outer longitudinal edges of its two spring rails. The result is accordingly a trimming, which is identified by reference numeral 56 in FIGS. 4 and 5.

Cutting the support elements 12 out of the combination 54 does create small raw cut edges 58 (FIGS. 4 and 5), but these edges are not vulnerable to attack by environmental factors because—in the case of zinc-plated support elements—they are protected by the so-called remote action.

The length of a combination 54 is determined by the size of the work stations in which method steps C, D, E and F are performed. However, it is entirely conceivable for the method steps A–F to be performed continuously; in other words, this combination is in a sense "endless", because as soon as the last support element 12 of the combination is cut off, a new, first pair of spring rails is simultaneously appended to the combination.

For transferring the gridlike combination 54 from one treatment station to the next, it is advantageous if openings 57 are made in the band strips 44—preferably in the region of where the trimmings 56 will later occur.

Independently of the method according to the invention having method steps A–F, it is conceivable for one half 16, toward the wiper blade, of a device for connecting the wiper blade 10 to a wiper arm 18 to be secured to the pairs 26, 28 of spring rails in the combination 44 that belong together. This kind of mounting process, which is designated as method step G in the drawing can be inserted between method steps B and C, for instance, or between method steps C and D, or between method steps D and E, or between method steps E and F. In this way, it is possible to dispense with a separate surface treatment of the device half 16.

Regardless of this, the support element 12 in general includes two parallel spring rails 26, 28 and at least two transverse or bridge ribs 30, 32 oriented transversely to these spring rails and located on both end portions. In wiper blades that are especially long, their support elements can certainly be equipped with other intermediate bridge ribs spaced apart from one another. In particular, the support element should distribute the contact pressure, exerted on the wiper blade by the wiper arm, against the window to be wiped properly over the entire length of the wiper blade and should guide the wiper strip without stress between its two spring rails. This is accomplished by the disposition of the two spring rails, intended for the particular application and suitably pre-curved, and by the fixed spacing between the two spring rails that is defined by bridge ribs. The half 16 toward the wiper blade, secured to the support element 12 in the middle portion thereof, of a device for connecting the wiper blade to a driven wiper arm 18 may indeed—like the two bridge ribs 30, 32—also contribute to stabilizing the wiper blade in its wiping direction, but this half does not affect the requirements in terms of contact pressure distribution and wiper strip guidance that are made of the support element. Hence the instant of its assembly need not be taken into consideration in determining the time sequence of the method steps that are part of the production method of the invention. Mounting the device half 16 on the support element 12, or on its individual elements—as an intermediate step between for instance method steps B and C or C and D or D and E or E and F—does not change the method of the invention from producing an advantageous support element in an especially economical way. The production method of the invention is characterized solely by the fact that the prefabricated spring rails 26, 28 of a plurality of support elements 12 are solidly joined together in pairs and oriented parallel to one another by means of at least one bandlike retaining element 44 oriented transversely to the spring rails, and that the resultant gridlike combination 54 is subjected to at least one further method step, by which the support elements 12 are detached from the combination 54 by cutting the retaining element between the respective pairs of spring rails.

After that, the mounting of the wiper blade can be done, which in accordance with the schematic breakdown in FIG. 6 can include further mounting steps:

G optional fastening of the half 16 toward the wiper blade of the aforementioned connection direction;

H inserting the rubber-elastic wiper strip 22 (FIG. 5) into the support element 12, the wiper strip in turn being produced by extrusion, for instance, and then cut to length, graphited, etc. (H2).

I securing the wiper strip 22 against longitudinal displacement in the support element 12; and K providing protective coverings 60 on the ends of the wiper blades.

A device according to the invention for performing the above-described method, or the variants of the method, includes essentially the device components shown in FIG. 6 and described in the above description.

What is claimed is:

1. A method for producing a bandlike-elongated, spring-elastic element (12) for supporting a rubber-elastic wiper strip (22) of a windshield wiper for vehicles, which element has two spring rails (26, 28), located with a spacing (24) from one another and essentially parallel to one another, which at least on both of their end portions are solidly joined together by transverse ribs (30) that are disposed on one band face (14) of the spring rails and that span the spacing (24), characterized in that the prefabricated spring rails (26, 28) of a plurality of support elements (12) are solidly joined together in pairs and oriented essentially parallel to one another by means of at least one bandlike retaining element (44) oriented transversely to the spring rails and located between the two pairs of spring rails (26,28); that the gridlike combination (54) thus obtained is subjected to at least one further method step, by which, by cutting the retaining element (44) between the applicable pairs of spring rails (26, 28), the support elements (12) are released from the combination (54).

2. The method of claim 1, characterized in that on each of the two end portions of the pairs of Spring rails (26, 28), one bandlike retaining element (44) is secured.

3. The method of claim 2, characterized in that the two bandlike retaining elements (44) are provided with recesses (48), which are adapted to the spacings (50) between the pairs of spring rails (26, 28) that belong together and which extend in bridgelike fashion from one spring rail (26, 28) to the other spring rail (26, 28) of one pair.

4. The method of claim 1, characterized in that the gridlike combination (54) is subjected to a heat treatment.

5. The method of claim 4, characterized in that the gridlike combination (54) is zinc-plated or provided with a coating that contains zinc.

6. The method of claim 4, characterized in that the gridlike combination (54) is painted.

7. The method of claim 1, characterized in that a device for joining the wiper blade to a wiper arm (18) is secured at a side facing toward the wiper blade, to the pairs of spring rails (26, 28) that belong together.

8. The method of claim 1, characterized in that the retaining element is cut out of the combination (54) along the outer longitudinal edges of both spring rails (26, 28).

9. The method of claim 1, characterized in that the spring rails (26, 28) in their longitudinal extent are provided with a curvature, on the outer side of which the bandlike retaining element (44) is secured.

* * * * *